(12) United States Patent
Arai et al.

(10) Patent No.: US 8,916,048 B2
(45) Date of Patent: Dec. 23, 2014

(54) WATER TREATMENT METHOD AND METHOD FOR PRODUCING ULTRAPURE WATER

(75) Inventors: Nobukazu Arai, Tokyo (JP); Nozomu Ikuno, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 13/579,749

(22) PCT Filed: Feb. 28, 2011

(86) PCT No.: PCT/JP2011/054459
§ 371 (c)(1),
(2), (4) Date: Oct. 11, 2012

(87) PCT Pub. No.: WO2011/108478
PCT Pub. Date: Sep. 9, 2011

(65) Prior Publication Data
US 2013/0032532 A1 Feb. 7, 2013

(30) Foreign Application Priority Data

Mar. 5, 2010 (JP) ................................. 2010-049230
Mar. 5, 2010 (JP) ................................. 2010-049231

(51) Int. Cl.
*C02F 9/04* (2006.01)
*C02F 3/02* (2006.01)
*C02F 1/76* (2006.01)
*C02F 1/50* (2006.01)
*C02F 3/00* (2006.01)
*C02F 3/06* (2006.01)
*C02F 9/00* (2006.01)

(52) U.S. Cl.
CPC ... *C02F 1/50* (2013.01); *C02F 1/76* (2013.01); *C02F 3/00* (2013.01); *C02F 3/02* (2013.01); *C02F 3/06* (2013.01); *C02F 9/00* (2013.01); *Y10S 210/90* (2013.01)
USPC ............ 210/631; 210/615; 210/754; 210/900

(58) Field of Classification Search
CPC ................ C02F 3/06; C02F 1/76; C02F 3/10; C02F 9/00; C02F 3/02; C02F 1/50
USPC .......................... 210/615, 617, 631, 754, 900
See application file for complete search history.

(56) References Cited

U.S. PATENT DOCUMENTS

| | | | |
|---|---|---|---|
| 5,385,664 A | 1/1995 | Oinuma et al. | |
| 6,207,047 B1 * | 3/2001 | Gothreaux | 210/150 |
| 2010/0206809 A1 * | 8/2010 | Ikuno | 210/638 |
| 2011/0128602 A1 | 6/2011 | Hamano et al. | |

FOREIGN PATENT DOCUMENTS

| | | |
|---|---|---|
| JP | S61-111192 A | 5/1986 |
| JP | S61-111198 A | 5/1986 |
| JP | S62-065791 A | 3/1987 |
| JP | S62-065793 A | 3/1987 |
| JP | S62-258798 A | 11/1987 |
| JP | 02-229595 A | 9/1990 |
| JP | H04-061984 A | 2/1992 |
| JP | 05-084500 A | 4/1993 |
| JP | H05-317871 A | 12/1993 |
| JP | H05-329477 A | 12/1993 |
| JP | H06-079272 A | 3/1994 |
| JP | 06-233997 A | 8/1994 |
| JP | 07-112189 A | 5/1995 |
| JP | 07-236883 A | 9/1995 |
| JP | 07-284799 A | 10/1995 |
| JP | 07-313994 A | 12/1995 |
| JP | H08-071593 A | 3/1996 |
| JP | H09-075968 A | 3/1997 |
| JP | 09-094585 A | 4/1997 |
| JP | H09-094568 A | 4/1997 |
| JP | H10-309588 A | 11/1998 |
| JP | 2000-288578 A | 10/2000 |
| JP | 6233997 | * 11/2001 |
| JP | 2002-159984 A | 6/2002 |
| JP | 2002-336886 A | 11/2002 |
| JP | 2002-336887 A | 11/2002 |
| JP | 2002336887 | * 11/2002 |
| JP | 2003-190979 A | 7/2003 |
| JP | 2003-340481 A | 12/2003 |
| JP | 2006-212484 A | 8/2006 |
| JP | 2008-229484 A | 10/2008 |
| JP | 2009-000912 A | 1/2009 |
| JP | 2010-049232 A | 3/2010 |

OTHER PUBLICATIONS

Ikuno, English machine translation, JP 2002-336887, Nov. 26, 2002, pp. 1-8.*
Oinuma et al, English machine translation, JP 3227863, Nov. 12, 2001, pp. 1-5.*
Japan Patent Office, "Office Action for JP2010-049230," Feb. 25, 2014.
Japan Patent Office, "Office Action for JP 2010-049231," Feb. 18, 2014.

* cited by examiner

*Primary Examiner* — Nam Nguyen
*Assistant Examiner* — Claire Norris
(74) *Attorney, Agent, or Firm* — Manabu Kanesaka

(57) ABSTRACT

A water treatment method and a method for producing ultrapure water are provided in which urea in raw water is sufficiently decomposed, and an organism (bacterial cells) in biological treatment is prevented from flowing downstream. In a water treatment method for performing biological treatment of raw water containing urea, a carbon source is added to the raw water, and the raw water is then supplied to biological treatment means 1 and 2 having a fixed bed formed of an organism-supporting carrier to perform the biological treatment. The biological treatment after the addition of the carbon source to the raw water improves the efficiency of decomposition and removal of urea. The biological treatment means using a fixed bed formed of an organism-supporting carrier decreases the number of bacterial cells flowing downstream.

10 Claims, 3 Drawing Sheets

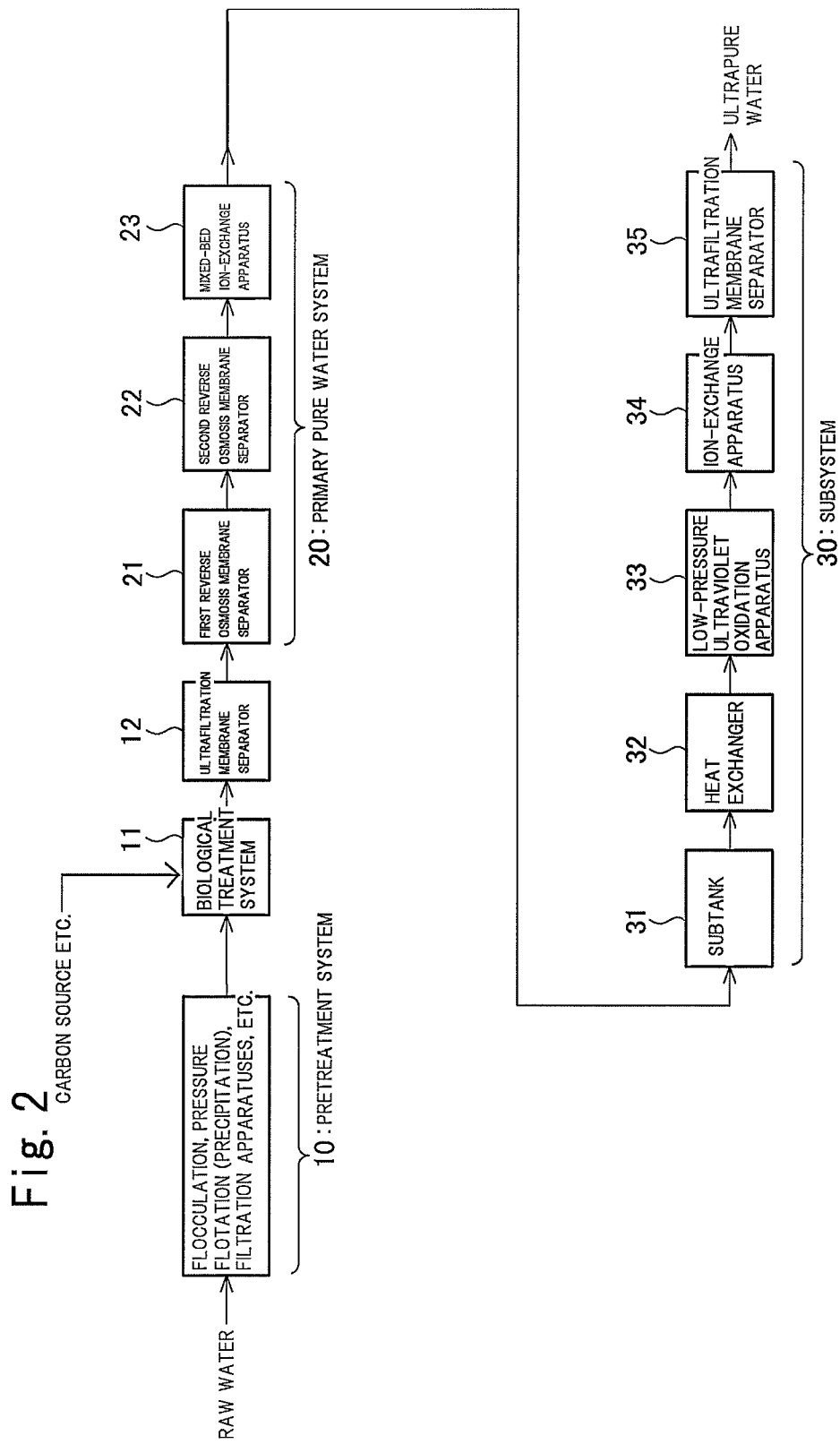

WATER TREATMENT METHOD AND METHOD FOR PRODUCING ULTRAPURE WATER

FIELD OF INVENTION

The present invention relates to a water treatment method for raw water and a method for producing ultrapure water and, more particularly, to a water treatment method for sufficiently removing urea in raw water and a method for producing ultrapure water utilizing the water treatment method.

BACKGROUND OF INVENTION

Ultrapure water production systems for producing ultrapure water from raw water, such as city water, groundwater, or industrial water, basically include a pretreatment system, a primary pure water production system, and a secondary pure water production system. The pretreatment system includes flocculation, floatation, and filtering apparatuses. The primary pure water production system includes two reverse osmosis membrane separators and a mixed-bed ion-exchange apparatus, or an ion-exchange pure water apparatus and a reverse osmosis membrane separator. The secondary pure water production system includes a low-pressure mercury lamp ultraviolet oxidation apparatus, a mixed-bed ion-exchange apparatus, and an ultrafiltration membrane separator.

In recent years, there has been a demand for the production of higher-purity ultrapure water. To this end, it is necessary to sufficiently remove urea in ultrapure water, which prevents a decrease in TOC.

Patent Literatures 1 to 3 disclose that removal of urea from water supplied to an ultrapure water production system can decrease the TOC of ultrapure water.

According to Patent Literature 1 (Japanese Patent Publication 6-63592A (Japanese Patent 3468784)), a biological treatment apparatus installed in a pretreatment system decomposes urea. According to Patent Literature 2 (Japanese Patent Publication 6-233997A (Japanese patent 3227863)), mixed water of water to be treated (industrial water) and recovered semiconductor rinse water is supplied to a biological treatment apparatus installed in a pretreatment system. An organic substance in the recovered semiconductor rinse water serves as a carbon source for a biological treatment reaction and increases the decomposition rate of urea. However, a large number of ammonium ions ($NH_4^+$) sometimes contained in the recovered semiconductor rinse water can serve as a nitrogen source like urea and prevent the decomposition of urea. In order to solve this problem, Patent Literature 3 (Japanese Patent Publication 7-313994A (Japanese patent 3417052)) discloses that water to be treated (industrial water) and recovered semiconductor rinse water are separately subjected to biological treatment, are then mixed, and are supplied to a primary pure water production system and a secondary pure water production system.

The addition of a carbon source to water to be treated, as described in Patent Literature 2, can improve the efficiency of decomposition and removal of urea in a biological treatment apparatus but increases the number of bacterial cells grown in the biological treatment apparatus, thus increasing the number of bacterial cells flowing out of the biological treatment apparatus.

Furthermore, as described in Patent Literature 2, use of recovered semiconductor rinse water containing many ammonium ions as a carbon source results in prevention of the decomposition of urea due to the ammonium ions.

Patent Literature 4 (Japanese Patent Publication 9-94585A (Japanese patent 3919259)) discloses that sodium bromide and sodium hypochlorite are added to water to be treated to decompose urea in the water. Paragraphs [0030] and [0039] and FIG. 1 in Patent Literature 4 note that treated water after decomposition and removal of urea with sodium bromide and sodium hypochlorite is supplied to an activated carbon column to decompose and remove sodium hypochlorite.

According to Patent Literature 4, the activated carbon column is to decompose and remove residual sodium hypochlorite ([0039] in Patent Literature 4) and is not to biologically treat sodium bromide and sodium hypochlorite with activated carbon after the addition and decomposition of sodium bromide and sodium hypochlorite.

PATENT LITERATURE

Patent Literature 1: Japanese Patent Publication 6-63592A
Patent Literature 2: Japanese Patent Publication 6-233997A
Patent Literature 3: Japanese Patent Publication 7-313994A
Patent Literature 4: Japanese Patent Publication 9-94585A

OBJECT AND SUMMARY OF INVENTION

Object of Invention

It is a first object of the present invention to provide a water treatment method for sufficiently decomposing urea in raw water and decreasing the number of bacterial cells flowing out of a biological treatment apparatus, and a method for producing ultrapure water utilizing the water treatment method.

It is a second object of the present invention to provide a water treatment method for sufficiently decomposing urea even in water to be treated containing ammonium ions, and a method for producing ultrapure water utilizing the water treatment method.

It is a third object of the present invention to provide a water treatment method for sufficiently decomposing urea in raw water, and a method for producing ultrapure water utilizing the water treatment method.

SUMMARY OF INVENTION

A water treatment method of a first aspect relates to a water treatment method for performing biological treatment of raw water containing urea. A carbon source is added to the raw water, and the raw water is then supplied to a biological treatment means having a fixed bed formed of an organism-supporting carrier to perform the biological treatment.

In accordance with a water treatment method of a second aspect, in the first aspect, an oxidizing agent and/or a bactericide is added to the raw water before the biological treatment.

A water treatment method of a third aspect relates to a water treatment method for performing biological treatment of raw water containing urea. A carbon source is added to the raw water, and the raw water is then supplied to a plurality of biological treatment means in series to perform the biological treatment.

In accordance with a water treatment method of a fourth aspect, in the third aspect, at least the most downstream biological treatment means has a fixed bed formed of an organism-supporting carrier.

In accordance with a water treatment method of a fifth aspect, in the third or fourth aspect, an oxidizing agent and/or a bactericide is added to water to be treated flowing into at least one of the biological treatment means.

In accordance with a water treatment method of a sixth aspect, in the third or fourth aspect, a carbon source is added to the raw water, the raw water is then supplied to a first biological treatment means, an oxidizing agent and/or a bactericide is added to treated water flowing from the first biological treatment means, and the treated water is then supplied to a second biological treatment means.

In accordance with a water treatment method of a seventh aspect, in any one of the second, fifth, and sixth aspects, the oxidizing agent and/or the bactericide is a chlorine agent.

In a method for producing ultrapure water according to an eighth aspect, water treated by the water treatment method according to any one of the first to seventh aspects is treated by a primary pure water apparatus and a secondary pure water apparatus to produce ultrapure water.

In accordance with the water treatment method of the first aspect, the addition of a carbon source to raw water before biological treatment improves the efficiency of decomposition and removal of urea. Furthermore, the biological treatment means having a fixed bed formed of an organism-supporting carrier decreases the number of bacterial cells flowing out of the biological treatment means as compared with the biological treatment means having a fluidized bed.

In accordance with the water treatment method of the third aspect, the addition of a carbon source to raw water before biological treatment improves the efficiency of decomposition and removal of urea. In particular, the raw water supplied to a plurality of biological treatment means in series is subjected to the biological treatment more than once, which further improves the efficiency of decomposition and removal of urea. Bacterial cells flowing out of an upstream biological treatment means are trapped in a downstream biological treatment means. This can decrease the number of bacterial cells flowing out of the biological treatment means.

In the case that raw water is supplied to a plurality of biological treatment means in series, when at least the most downstream biological treatment means is a fixed bed, this decreases the number of bacterial cells flowing out of the biological treatment means (the fourth aspect).

The addition of an oxidizing agent and/or a bactericide, such as a chlorine agent, to raw water before biological treatment improves the efficiency of decomposition of urea (the second, fifth, sixth, and seventh aspects).

Although a mechanism by which biological treatment in the presence of an oxidizing agent and/or a bactericide improves urea decomposing efficiency is not clear, a preferred bacterial strain in the absence of the oxidizing agent and/or the bactericide is different from a preferred bacterial strain in the presence of the oxidizing agent and/or the bactericide, and the later preferred bacterial strain probably contributes to the decomposition of urea and urea derivatives. More specifically, it is surmised that a bacterial strain that efficiently decomposes urea and urea derivatives is resistant to the oxidizing agent and/or the bactericide, retains activity even in the presence of the oxidizing agent and/or the bactericide while other bacterial strains are deactivated, and becomes predominant, thus improving the efficiency of decomposition of urea.

An excessively high concentration of an oxidizing agent and/or a bactericide in raw water may result in a decreased number of bacterial cells by the action of the oxidizing agent and/or the bactericide, resulting in decreased efficiency of decomposition of urea. An excessively low concentration of an oxidizing agent and/or a bactericide in raw water may result in decreased efficiency of decomposition of urea. Thus, it is preferable to control the amount of oxidizing agent and/or bactericide to be added. If necessary, it is also preferable to remove an oxidizing agent by reduction.

A large amount (for example, 100 to 400 µg/L) of ammonium ions in raw water prevents the decomposition of urea in the biological treatment means. It is effective to add a chlorine agent as an oxidizing agent and/or a bactericide to water to be treated containing ammonium ions (the seventh aspect). Although the detailed mechanism for this is not clear, it is surmised that chloramine (combined chlorine) formed by a reaction between an ammonium ion and chlorine is difficult for an organism to incorporate, and therefore the organism preferentially decomposes and removes urea.

A water treatment method of a ninth aspect relates to a water treatment method for performing biological treatment of raw water containing an organic substance. The biological treatment is performed in the presence of an oxidizing agent and/or a bactericide.

In accordance with a water treatment method of a tenth aspect, in the ninth aspect, the concentration of a residual oxidizing agent and/or bactericide in biologically treated water is in a predetermined range.

In accordance with a water treatment method of an eleventh aspect, in the tenth aspect, the oxidizing agent and/or the bactericide is a chlorine agent, and the chlorine agent is added or reduced such that biologically treated water has a total residual chlorine concentration in the range of 0.02 to 0.1 mg/L in terms of $Cl_2$.

In accordance with a water treatment method of a twelfth aspect, in any one of ninth to eleventh aspects, the biological treatment, the raw water is brought into contact with an organism-supporting carrier.

In a method for producing ultrapure water according to a thirteenth aspect, water treated by the water treatment method according to any one of ninth to twelfth aspects is treated by a primary pure water apparatus and a secondary pure water apparatus to produce ultrapure water.

The present inventors completed the ninth to thirteenth aspects by finding that biological treatment in the presence of an oxidizing agent and/or a bactericide in raw water, in particular, biological treatment that leaves a predetermined amount of residual oxidizing agent and/or bactericide in biologically treated water improves the efficiency of decomposition of urea.

Although a mechanism by which biological treatment in the presence of an oxidizing agent and/or a bactericide improves urea efficiency is not fully clear but is surmised that a preferred bacterial strain in the absence of the oxidizing agent and/or the bactericide is different from a preferred bacterial strain in the presence of the oxidizing agent and/or the bactericide, and that the later preferred bacterial strain probably contributes to the decomposition of urea and urea derivatives. More specifically, it is surmised that a bacterial strain that efficiently decomposes urea and urea derivatives is resistant to the oxidizing agent and/or the bactericide, retains activity even in the presence of the oxidizing agent and/or the bactericide while other bacterial strains are deactivated, and becomes predominant, thus improving the efficiency of decomposition of urea.

An excessively high concentration of an oxidizing agent and/or a bactericide in raw water may result in a decreased number of bacterial cells by the action of the oxidizing agent and/or the bactericide, resulting in decreased efficiency of decomposition of urea. An excessively low concentration of an oxidizing agent and/or a bactericide in raw water may result in decreased efficiency of decomposition of urea. In the present invention, it is preferable to control the amount of oxidizing agent and/or bactericide to be added or, if necessary, it is preferable to remove an oxidizing agent by reduction such that a concentration of the oxidizing agent and/or the bactericide in water treated by a biological treatment means is in a predetermined range.

Advantageous Effects of Invention

The present invention improves the efficiency of decomposition of urea.

BRIEF DESCRIPTION OF DRAWINGS

FIG. 2 is a system diagram of a method for producing ultrapure water utilizing a biological treatment method according to an embodiment.

DESCRIPTION OF EMBODIMENTS

Figure 1A:
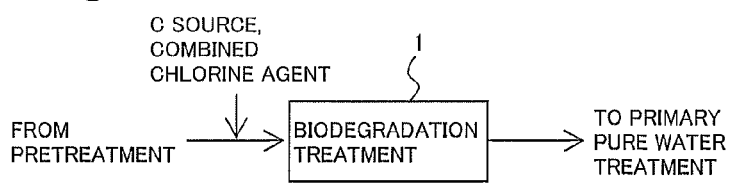
FIG. 1 is a system diagram of a biological treatment method according to an embodiment.

The present invention will be further described below.

First Embodiment

A water treatment method of a first embodiment relates to a water treatment method for performing biological treatment of raw water containing urea. A carbon source is added to the raw water, and the raw water is then supplied to a biological treatment means having a fixed bed formed of an organism-supporting carrier to perform the biological treatment.

Examples of water to be treated by this water treatment method include groundwater, river water, city water, other industrial water, and recovered water from semiconductor manufacturing processes. Such water may be purified. The purification is preferably performed with a pretreatment system in an ultrapure water production process or a similar system. More specifically, flocculation, pressure flotation, filtration, or another treatment, or a combination thereof is preferred.

The concentration of urea in raw water (water to be treated) is preferably in the range of approximately 5 to 200 μg/L, particularly approximately 5 to 100 μg/L.

The carbon source to be added is preferably an easily decomposable organic substance: for example, acetic acid, an acetate, such as sodium acetate, methanol, ethanol, or acetone. The carbon source is incorporated into an organism (bacterial cells) during biological treatment (assimilation) and therefore does not flow downstream. In the case of outflow, however, in order to remove the carbon source in post-treatment, the carbon source is preferably a substance, such as an acetate, that can be ionized in an aqueous solution and removed with an ion-exchange resin. With respect to the amount of carbon source added to raw water, the ratio (weight ratio) C/N of the C content to the N content derived from urea of water after the addition is preferably in the range of approximately 100/50 to 100/2, particularly approximately 100/10 to 100/5. If necessary, it is preferable to add a nutrient source for stimulating biological activity, for example, phosphorus or a minute amount of metal, such as iron, nickel, or cobalt.

It is preferable to further add an oxidizing agent and/or a bactericide before raw water (water to be treated) is supplied to a biological treatment means. This improves the efficiency of decomposition of urea. Furthermore, when the concentration of a residual oxidizing agent and/or bactericide in biologically treated water is in a predetermined range, this improves the efficiency of decomposition of urea.

The type of oxidizing agent and/or bactericide to be added is preferably, but not limited to, one that gives priority to a bacterial strain that efficiently decomposes urea. More specifically, the oxidizing agent and/or the bactericide is preferably sodium hypochlorite, a chlorine oxidizing agent, such as chlorine dioxide, or a combined chlorine agent (stabilized chlorine agent), such as monochloramine or dichloramine.

When activated carbon is used as a carrier, as described below, although both free chlorine and combined chlorine decompose due to a catalytic reaction of the activated carbon, combined chlorine is more resistant to decomposition even in contact with the activated carbon. Thus, when activated carbon is used as a carrier, the oxidizing agent and/or the bactericide is preferably a combined chlorine agent. In particular, the oxidizing agent and/or the bactericide is preferably a combined chlorine agent that is moderately reactive with activated carbon, for example, a combined chlorine agent composed of a chlorine oxidizing agent and a sulfamic acid compound.

The amounts of oxidizing agent and/or bactericide to be added are preferably such that the concentration of a residual oxidizing agent and/or bactericide in biologically treated water is a predetermined concentration or less. The predetermined concentration depends on the type of oxidizing agent and/or bactericide. For a chlorine agent, the predetermined concentration is preferably such that biologically treated water has a total residual chlorine concentration of 0.1 mg or less, for example, in the range of 0.02 to 0.1 mg/L, particularly 0.02 to 0.06 mg/L, in terms of $Cl_2$. The total residual chlorine, as used herein, refers to the sum of a free residual chlorine and a combined residual chlorine. The total residual chlorine concentration, as used herein, refers to the sum of the free residual chlorine concentration and the combined residual chlorine concentration. A free residual chlorine has greater oxidizing and bactericidal ability than a combined residual chlorine. Thus, the free residual chlorine concentration is preferably not more than or less than 0.02 mg/L in terms of $Cl_2$. As described above, the chlorine agent prevents urea decomposition from being inhibited by ammonium ions in raw water.

When water to be treated originally contains an oxidizing agent (for example, tap water, which contains the total residual chlorine) or when an oxidizing agent is used in treatment prior to biological treatment, the water can be directly subjected to biological treatment to perform the biological treatment in the presence of the oxidizing agent. When water subjected to biological treatment has a low oxidizing agent concentration, however, the biological treatment in the presence of the oxidizing agent cannot be performed because of early consumption of the oxidizing agent in the biological treatment. On the other hand, an excessively high concentration of an oxidizing agent and/or a bactericide in water to be treated may result in deactivation or extinction of bacterial cells in the biological treatment means because of the bactericidal action of the oxidizing agent and/or the bactericide. Thus, it is preferable to measure the concentration of an oxidizing agent and/or a bactericide in water to be treated and control the amount of oxidizing agent and/or bactericide to be added or, if necessary, reduce the oxidizing agent and/or the bactericide such that the concentration is in a predetermined range.

The concentration of an oxidizing agent and/or a bactericide may be measured by any method, for example, an N,N-diethylphenylenediamine (DPD) method, polarography, or absorptiometry, which measures the chlorine concentration. Alternatively, the concentration of an oxidizing agent and/or a bactericide may be estimated from the oxidation-reduction potential (ORP) of the water system. On the basis of these measurements, an excessive amount of oxidizing agent and/or bactericide is dealt with the addition of a reducing agent, and lack of an oxidizing agent and/or a bactericide is dealt with the addition of the oxidizing agent and/or the bactericide.

In the present embodiment, a biological treatment system for biological treatment of water to be treated is preferably a fixed bed formed of an organism-supporting carrier, particularly a down-flow fixed bed, which can decrease the number of bacterial cells flowing out of the biological treatment system.

In a biological treatment means having a fixed bed, it is preferable to appropriately wash the fixed bed. This prevents the blockage of the fixed bed caused by the growth of an organism (bacterial cells), the formation of mud balls, and a decrease in the efficiency of decomposition and removal of urea. The washing may be performed by any method; for example, backwash is preferred. More specifically, wash water is supplied in the direction opposite to that in which raw water is supplied to fluidize carriers, thereby discharging deposits to the outside, pulverizing mud balls, and eliminating part of the organism.

The type of carrier in the fixed bed may be, but is not limited to, activated carbon, anthracite, sand, zeolite, ion-exchange resin, or a plastic formed product. In order to perform biological treatment in the presence of an oxidizing agent and/or a bactericide, a carrier with low consumption of the oxidizing agent and/or the bactericide is preferred. However, when a high concentration of an oxidizing agent and/or a bactericide can flow into a biological treatment means, a carrier that can decompose the oxidizing agent and/or the bactericide, such as activated carbon, may be used. Use of activated carbon prevents deactivation or extinction of bacterial cells even with a high concentration of an oxidizing agent and/or a bactericide in water to be treated.

The flow rate of water supplied to the biological treatment means preferably has a SV in the range of approximately 5 to 50 $h^{-1}$. Water supplied to the biological treatment means preferably has normal temperature, for example, in the range of 10° C. to 35° C., and an approximately neutral pH, for example, in the range of 4 to 8. Thus, an optional heat exchanger or means for adding a pH-adjusting agent is preferably disposed before the biological treatment means.

FIG. 1a illustrates an example of a flow according to the first embodiment (an embodiment for claim 2). In FIG. 1a, raw water is treated water from a pretreatment system of an ultrapure water production system. In FIG. 1a, after the addition of a carbon source and a combined chlorine agent, the treated water from the pretreatment system is subjected to biological treatment, and biologically treated water is supplied to a primary pure water system.

Second Embodiment

A water treatment method of a second embodiment relates to a water treatment method for performing biological treatment of raw water containing urea. A carbon source is added to the raw water, and the raw water is then supplied to a plurality of biological treatment means in series to perform the biological treatment. In accordance with the present embodiment, raw water is supplied to a plurality of biological treatment means in series to perform biological treatment more than once. Thus, the efficiency of decomposition and removal of urea is improved as compared with biological treatment in one pass.

The carbon source is added to raw water before the most upstream biological treatment means. The carbon source may also be added to water flowing into the second or later biological treatment means. This improves the efficiency of removal of urea at the second or later biological treatment means.

In the present embodiment, except for the final biological treatment means, a biological treatment system for biological treatment of water to be treated is not particularly limited. The biological treatment means other than the final stage (for two-stage treatment, the first biological treatment means) may be a fluidized bed or a suspended activated sludge process. The final stage is preferably a biological treatment means having a fixed bed carrier.

The fixed bed carrier method prevents bacterial cells from flowing out of the biological treatment means and being decreased, thereby preventing a decrease in the efficiency of decomposition. The fixed bed carrier method also prevents outflowing bacterial cells from causing suspended sediment load or slime obstacles in a primary pure water system. The biological treatment means for biological treatment by the fixed bed carrier method is preferably of a down-flow mode, which causes a decreased amount of organism flowing out of the biological treatment means. When at least the most downstream biological treatment means is a fixed bed, this can prevent an organism (bacterial cells) from flowing downstream. When all the biological treatment means are fixed beds, this results in a markedly decreased amount of organism or carrier flowing out of the biological treatment means, thereby markedly decreasing load in the subsequent post-treatment. Furthermore, when the most downstream biological treatment means is a fixed bed, and at least one of the other biological treatment means is a fluidized bed, the biological treatment means having the fluidized bed improves the efficiency of decomposition and removal of urea, and an organism flowing out of the biological treatment means having the fluidized bed is sufficiently trapped by the downstream biological treatment means having the fixed bed. This decreases load in the stages after the biological treatment means.

Also in the present embodiment, biological treatment in at least one biological treatment means is preferably performed in the presence of an oxidizing agent and/or a bactericide. This improves the efficiency of decomposition of urea. For example, when raw water is supplied to two biological treatment means in series, an oxidizing agent and/or a bactericide may be added before the first biological treatment means or between the first and second biological treatment means or both.

The concentration of a carbon source or the concentration of an oxidizing agent and/or a bactericide may be different for each biological treatment means to vary the microbial flora in the biological treatment means. Thus, the decomposition and removal of urea can be improved by using various types of biological treatment.

Figure 1B:
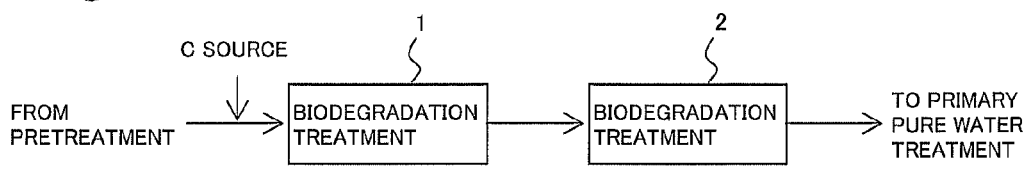

FIG. 1b illustrates an example of the second embodiment. In FIG. 1b, raw water is treated water from a pretreatment system of an ultrapure water production system. A carbon source is added to the treated water from the pretreatment system. The treated water is then supplied to a first biological treatment means 1. Treated water from the first biological treatment means 1 is then supplied to a second biological treatment means 2. Water treated by the second biological treatment means 2 is then supplied to a primary pure water system.

As described above, the first biological treatment means 1 is not limited to a fixed bed and may be a fluidized bed. The second biological treatment means 2 is preferably a fixed bed, particularly a down-flow fixed bed.

Figure 1C:
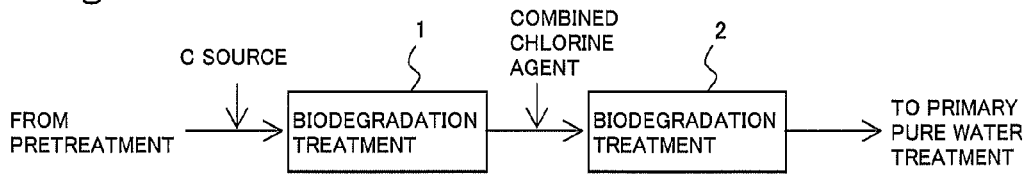

FIG. 1c illustrates another example of the second embodiment. In FIG. 1c, a combined chlorine agent is added as a bactericide to treated water flowing from the first biological treatment means 1 in FIG. 1b. The other constituents are as described in FIG. 1b.

Figure 1D:
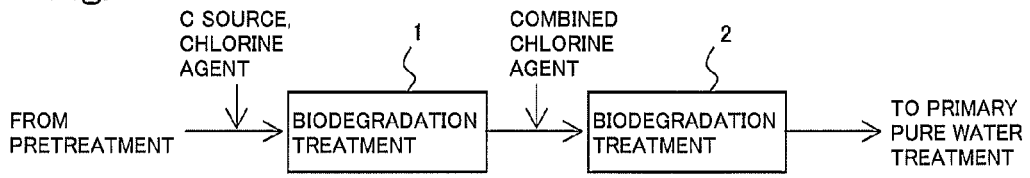

FIG. 1d illustrates still another example of the second embodiment. In FIG. 1d, a carbon source and an oxidizing agent (a chlorine agent in this embodiment) are added to the treated water flowing from the pretreatment system in FIG. 1c. The other constituents are as described in FIG. 1c.

The other preferred constituents in the second embodiment are as described in the first embodiment.

A method for producing ultrapure water utilizing a water treatment method according to the present invention will be described below with reference to FIG. 2. In accordance with a method for producing ultrapure water illustrated in FIG. 2, raw water is treated in a pretreatment system 10, a biological treatment system 11, an ultrafiltration (UF) membrane separator 12, a primary pure water treatment system 20, and a subsystem 30.

The pretreatment system 10 includes flocculation, pressure flotation (precipitation), and filtration (membrane filtration) apparatuses. Suspended matter and colloidal substances in raw water are removed in the pretreatment system 10. Macromolecular organic substances and hydrophobic organic substances can also be removed in the pretreatment system 10.

A carbon source and, if necessary, an oxidizing agent and/or a bactericide are added to water flowing from the pretreatment system 10. The biological treatment described above is performed in the biological treatment system 11. The biological treatment system 11 may be any of those illustrated in FIGS. 1a to 1d. A microorganism and carrier fine particles from the biological treatment system 11 are separated and removed in the ultrafiltration membrane separator 12 disposed downstream of the biological treatment system 11. The ultrafiltration membrane separator 12 may be omitted.

The primary pure water treatment system 20 includes a first reverse osmosis (RO) membrane separator 21, a second reverse osmosis (RO) membrane separator 22, and a mixed-bed ion-exchange apparatus 23 in this order. The primary pure water treatment system 20 is not limited to this structure. For example, a reverse osmosis apparatus, an ion-exchange treatment apparatus, an electrodeionization treatment apparatus, and a UV oxidation treatment apparatus may be used in combination.

The subsystem 30 includes a subtank 31, a heat exchanger 32, a low-pressure ultraviolet oxidation apparatus 33, a mixed-bed ion-exchange apparatus 34, and a UF membrane separator 35 in this order. In the subsystem 30, treated water from the primary pure water treatment system 20 is supplied to the low-pressure ultraviolet oxidation apparatus 33 through the subtank 31 and the heat exchanger 32, and TOCs in the treated water are ionized or decomposed. Ionized organic substances are removed in the subsequent mixed-bed ion-exchange apparatus 34. Treated water from the mixed-bed ion-exchange apparatus 34 is subjected to membrane separation in the UF membrane separator 35 to yield ultrapure water. The subsystem 30 is not limited to this structure. For example, a deaerator, a UV oxidation treatment apparatus, an ion-exchange treatment apparatus (nonregenerative), and an ultrafiltration membrane treatment apparatus (removal of fine particles) may be used in combination.

In accordance with this method for producing ultrapure water, urea is sufficiently decomposed and removed in the biological treatment system 11, and therefore high-purity ultrapure water can be efficiently produced. Furthermore, in the case that the final biological treatment means of the biological treatment system 11 is a fixed bed, this prevents an organism (bacterial cells) and carrier fine particles from flowing out of the biological treatment system 11. This prevents bacterial cells from causing suspended sediment load or slime obstacles in a subsequent primary pure water system.

In accordance with this method for producing ultrapure water, raw water is supplied to the pretreatment system 10 before the biological treatment system 11 to remove suspended sediment in the raw water. This prevents the efficiency of decomposition and removal of urea in the biological treatment system 11 from being decreased owing to suspended sediment and prevents an increase in pressure loss in the biological treatment system 11. In accordance with this method for producing ultrapure water, the ultrafiltration membrane separator 12, the primary pure water treatment system 20, and the subsystem 30 are disposed downstream of the biological treatment system 11. Thus, an organism and carriers from the biological treatment system 11 are sufficiently removed by the ultrafiltration membrane separator 12, the primary pure water treatment system 20, and the subsystem 30.

Although urea is removed after the pretreatment in FIG. 2, urea may be removed before the pretreatment.

Third Embodiment

A third embodiment (the ninth to thirteenth aspects) will be described in detail below.

In accordance with the water treatment methods of the ninth to thirteenth aspects, in a water treatment method for performing biological treatment of raw water containing an organic substance, the biological treatment is performed in the presence of an oxidizing agent and/or a bactericide.

Examples of water to be treated by this water treatment method include groundwater, river water, city water, other industrial water, and recovered water from semiconductor manufacturing processes. Such water may be purified. The purification is preferably performed with a pretreatment system in an ultrapure water production process or a similar system. More specifically, flocculation, pressure flotation, filtration, or another treatment, or a combination thereof is preferred.

The concentration of urea in raw water (water to be treated) is preferably in the range of approximately 5 to 200 μg/L, particularly approximately 5 to 100 μg/L.

The type of oxidizing agent and/or bactericide to be added is preferably, but not limited to, one that gives priority to a bacterial strain that efficiently decomposes urea. More specifically, the oxidizing agent and/or the bactericide is preferably sodium hypochlorite, a chlorine oxidizing agent, such as chlorine dioxide, or a combined chlorine agent (stabilized chlorine agent), such as monochloramine or dichloramine.

When activated carbon is used as a carrier, as described below, although both free chlorine and combined chlorine decompose due to a catalytic reaction of the activated carbon, combined chlorine is more resistant to decomposition even in contact with the activated carbon. Thus, when activated carbon is used as a carrier, the oxidizing agent and/or the bactericide is preferably a combined chlorine agent. In particular, the oxidizing agent and/or the bactericide is preferably a combined chlorine agent that is moderately reactive with activated carbon, for example, a combined chlorine agent composed of a chlorine oxidizing agent and a sulfamic acid compound.

The amounts of the oxidizing agent and/or the bactericide to be added are preferably such that the concentration of a residual oxidizing agent and/or bactericide in biologically treated water is in a predetermined range. The predetermined range depends on the type of oxidizing agent and/or bactericide. For a chlorine agent, the predetermined range is preferably such that biologically treated water has a total residual chlorine concentration in the range of 0.02 to 0.1 mg/L, particularly 0.02 to 0.05 mg/L, in terms of $Cl_2$. The total residual chlorine, as used herein, refers to the sum of a free residual chlorine and a combined residual chlorine. The total residual chlorine concentration, as used herein, refers to the sum of the free residual chlorine concentration and the combined residual chlorine concentration. A free residual chlorine has greater oxidizing and bactericidal ability than a combined residual chlorine. Thus, the free residual chlorine concentration is preferably not more than or less than 0.02 mg/L in terms of $Cl_2$.

When water to be treated originally contains an oxidizing agent (for example, tap water, which contains the total residual chlorine) or when an oxidizing agent is used in treatment prior to biological treatment, the water can be directly subjected to biological treatment to perform the biological treatment in the presence of the oxidizing agent. When water subjected to biological treatment has a low oxidizing agent concentration, however, the biological treatment in the presence of the oxidizing agent cannot be performed because of early consumption of the oxidizing agent in the biological treatment. On the other hand, an excessively high concentration of an oxidizing agent and/or a bactericide in water to be treated may result in deactivation or extinction of bacterial cells in the biological treatment means because of the bactericidal action of the oxidizing agent and/or the bactericide. Thus, it is preferable to measure the concentration of an oxidizing agent and/or a bactericide in water to be treated and control the amount of oxidizing agent and/or bactericide to be added or, if necessary, reduce the oxidizing agent and/or the bactericide such that the concentration is in a predetermined range.

The concentration of an oxidizing agent and/or a bactericide may be measured by any method, for example, an N,N-diethylphenylenediamine (DPD) method, polarography, or absorptiometry, which measures the chlorine concentration. Alternatively, the concentration of an oxidizing agent and/or a bactericide may be estimated from the oxidation-reduction potential (ORP) of the water system. On the basis of these measurements, an excessive amount of oxidizing agent and/or bactericide is dealt with the addition of a reducing agent, and lack of an oxidizing agent and/or a bactericide is dealt with the addition of the oxidizing agent and/or the bactericide.

A biological treatment system for biological treatment of water to be treated is not particularly limited and preferably uses a carrier method, which can decrease the number of bacterial cells flowing out of the biological treatment system. This prevents bacterial cells from flowing out of the biological treatment system and being decreased, thereby preventing a decrease in the efficiency of decomposition. This also prevents outflowing bacterial cells from causing suspended sediment load or slime obstacles in the subsequent stages.

Biological treatment means for biological treatment by the carrier method may be an up-flow biodegradation apparatus or a down-flow biodegradation apparatus. The up-flow biodegradation apparatus may be a fluidized bed biodegradation apparatus or a fixed bed biodegradation apparatus, in which carriers are not fluidized, and is preferably a fixed bed biodegradation apparatus, which has a decreased number of bacterial cells flowing out of the apparatus.

The type of carrier may be, but is not limited to, activated carbon, anthracite, sand, zeolite, ion-exchange resin, or a plastic formed product. In order to perform biological treatment in the presence of an oxidizing agent and/or a bactericide, a carrier with low consumption of the oxidizing agent and/or the bactericide is preferred. However, when a high concentration of an oxidizing agent and/or a bactericide can flow into an organism part treatment means, a carrier that can decompose the oxidizing agent and/or the bactericide, such as activated carbon, may be used. This prevents deactivation or extinction of bacterial cells caused by a high concentration of an oxidizing agent and/or a bactericide.

The flow rate of water supplied to the biological treatment means preferably has a SV in the range of approximately 5 to 50 $h^{-1}$. Water supplied to the biological treatment means preferably has normal temperature, for example, in the range of 10° C. to 35° C., and an approximately neutral pH, for example, in the range of 4 to 8. Thus, an optional heat exchanger or means for adding a pH-adjusting agent is preferably disposed before the biological treatment means.

In accordance with the water treatment methods of the ninth to thirteenth aspects, biological treatment is performed in the presence of an oxidizing agent and/or a bactericide in water to be treated. This improves the efficiency of decomposition of urea. Furthermore, when the concentration of a residual oxidizing agent and/or bactericide in biologically treated water is in a predetermined range, this improves the efficiency of decomposition of urea.

A method for producing ultrapure water utilizing this water treatment method will be described below with reference to FIG. 3.

Figure 3:
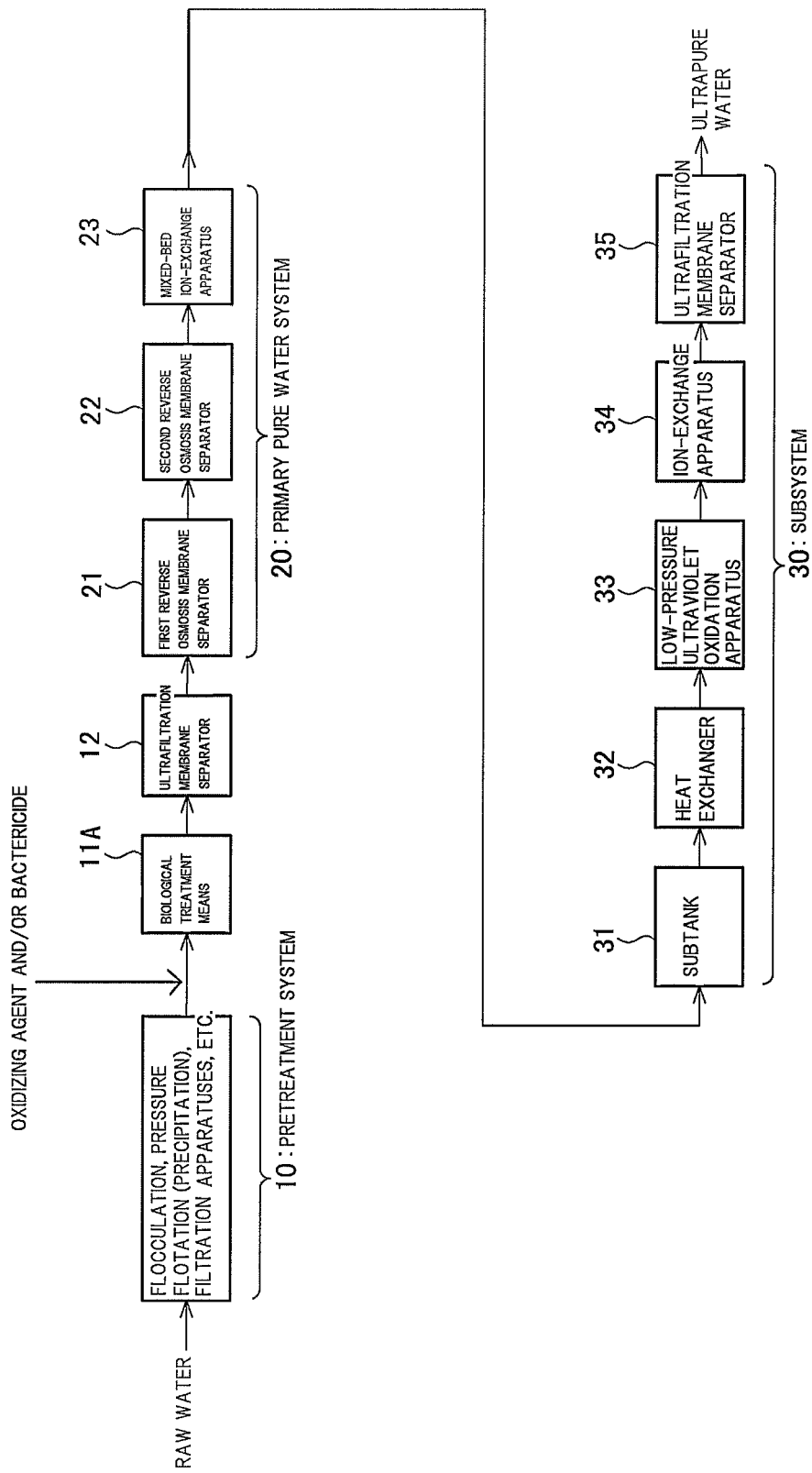
FIG. 3 is a system diagram of a method for producing ultrapure water utilizing a biological treatment method according to an embodiment.

In accordance with a method for producing ultrapure water illustrated in FIG. 3, raw water is treated in a pretreatment system 10, a biological treatment means 11A, an ultrafiltration (UF) membrane separator 12, a primary pure water treatment system 20, and a subsystem 30.

The pretreatment system 10 includes flocculation, pressure flotation (precipitation), and filtration (membrane filtration) apparatuses. Suspended matter and colloidal substances in raw water are removed in the pretreatment system 10. Macromolecular organic substances and hydrophobic organic substances can also be removed in the pretreatment system 10.

An oxidizing agent and/or a bactericide is added to water flowing from the pretreatment system 10. The water is then supplied to the biological treatment means 11A and is treated as described above. The biological treatment means 11A has the same structure as described above. A microorganism and carrier fine particles from the biological treatment means 11A are separated and removed in the ultrafiltration membrane separator 12 disposed downstream of the biological treatment means 11A.

The primary pure water treatment system 20 includes a first reverse osmosis (RO) membrane separator 21, a second reverse osmosis (RO) membrane separator 22, and a mixed-bed ion-exchange apparatus 23 in this order. The primary pure water treatment system 20 is not limited to this structure. For example, a reverse osmosis apparatus, an ion-exchange treatment apparatus, an electrodeionization treatment apparatus, and a UV oxidation treatment apparatus may be used in combination.

The subsystem 30 includes a subtank 31, a heat exchanger 32, a low-pressure ultraviolet oxidation apparatus 33, a mixed-bed ion-exchange apparatus 34, and a UF membrane separator 35 in this order. In the subsystem 30, treated water from the primary pure water treatment system 20 is supplied to the low-pressure ultraviolet oxidation apparatus 33 through the subtank 31 and the heat exchanger 32, and TOCs in the treated water are ionized or decomposed. Ionized organic substances are removed in the subsequent mixed-bed ion-exchange apparatus 34. Treated water from the mixed-bed ion-exchange apparatus 34 is subjected to membrane separation in the UF membrane separator 35 to yield ultrapure water. The subsystem 30 is not limited to this structure. For example, a deaerator, a UV oxidation treatment apparatus, an ion-exchange treatment apparatus (nonregenerative), and an ultrafiltration membrane treatment apparatus (removal of fine particles) may be used in combination.

In accordance with this method for producing ultrapure water, urea is sufficiently decomposed and removed in the biological treatment means 11A, and therefore high-purity ultrapure water can be efficiently produced. Although urea is removed after the pretreatment in FIG. 3, urea may be removed before the pretreatment.

EXAMPLES

Examples and Comparative Examples of First to Eighth Aspects

The first to eighth aspects are more specifically described in the following examples and comparative examples.

Example 1

Like the flow illustrated in FIG. 1a, after the addition of a carbon source, a combined chlorine agent, and a phosphorus source to raw water, the raw water was supplied to a single-stage biological treatment means for biological treatment.

City water (city water of Nogi-machi; an average urea concentration of 10 μg/L, an average TOC concentration of 500 μg/L), if necessary, containing a reagent urea (manufactured by Kishida Chemical Co., Ltd.) was used as raw water.

The carbon source was sodium acetate (manufactured by Kishida Chemical Co., Ltd.). The combined chlorine agent was a slime control agent manufactured by Kurita Water Industries Ltd. (combined chlorine "Kuriverter IK110"). The phosphorus source was sodium dihydrogen phosphate (manufactured by Kishida Chemical Co., Ltd.).

A cylindrical container was charged with 10 L of granular activated carbon ("Kuricoal WG160, 10/32 mesh", manufactured by Kurita Water Industries Ltd.), which served as an organism carrier, to form a fixed bed as the biological treatment means. Through acclimatization with the reagent urea, the biological treatment means had already acquired the capability to decompose urea.

Sodium acetate, the slime control agent, and sodium dihydrogen phosphate were added to the city water (free of the reagent urea) to the following concentrations. The city water was supplied downward to the biological treatment means. The flow rate SV was 20/h (water flow per hour/amount of charged activated carbon). The urea concentration of biologically treated water was measured. Table 1 shows the results.

Sodium acetate: 500 μg/L
Slime control agent: 0.2 mg/L in terms of $Cl_2$
Sodium dihydrogen phosphate: 5 μg/L After the elapse of 48 hours, 100 μg/L of the reagent urea, together with the agents described above, was added to the city water to prepare simulated raw water, which was then supplied to the biological treatment means. While the simulated raw water was continuously supplied, the urea concentration of biologically treated water was measured after the elapse of 6, 12, and 24 hours. Table 1 shows the results.

The analytical procedures for urea are described below. First, the total residual chlorine concentration of test water was measured by a DPD method, and the test water was reduced with a significant amount of sodium bisulfite. (Subsequently, it was confirmed by the DPD method that the total residual chlorine was less than 0.02 mg/L.) The reduced test water was then supplied to an ion-exchange resin ("KR-UM1", manufactured by Kurita Water Industries Ltd.) at an SV of 50/h for deionization. After the reduced test water was concentrated 10 to 100 times with a rotary evaporator, the urea concentration was measured by a diacetylmonoxime method.

The pH was not adjusted during the test period. The pH during the test period was in the range of 6.8 to 7.5. The temperature of the city water during the test period was in the range of 24° C. to 26° C. (15° C. or more) and was not considered to inhibit biological reactions. Thus, the water temperature was also not adjusted. The dissolved oxygen (DO) concentration of biologically treated water during the test period was in the range of 3.8 to 4.5 mg/L and was not considered to be insufficient. Thus, the dissolved oxygen concentration was also not adjusted. During the test period, the total residual chlorine concentration of biologically treated water was in the range of 0.05 to 0.1 mg/L in terms of $Cl_2$ (the free residual chlorine concentration was 0.02 mg/L or less in terms of $Cl_2$).

Table 2 shows the FI (SDI) value of biologically treated water after the elapse of 24 hours. FI (fouling index) and SDI (silt density index) are water supply indexes for a reverse osmosis membrane and principally indicate suspended sediment load and the incidence of slime obstacles. The FI (SDI) value is determined by following the procedure below. Dead-end filtration was performed with a membrane filter having φ47 mm and a nominal pore size of 0.45 μm at a working pressure of 0.2 MPa (30 psi). The FI (SDI) value is calculated from $T_1$ (s) required for 500 mL filtration and $T_2$ (s) required for 500 mL filtration after filtration for 15 minutes by the following equation. The RO water supply standard for this FI (SDI) value is 3 or more and less than 4.

$$FI(SDI)=(1-T_1/T_2)/15$$

Comparative Example 1

The simulated raw water was treated in the same manner as in Example 1 except that no carbon source was added. Tables 1 and 2 show the results.

Reference Example 1

The simulated raw water was treated in the same manner as in Example 1 except that no slime control agent (combined chlorine agent) was added and that no slime control agent was added during acclimatization. Tables 1 and 2 show the results.

Example 2

The simulated raw water was treated in the same manner as in Example 1 except that two biological treatment means each of which was the same as the biological treatment means in Example 1 were disposed in series and that no slime control agent was added to the city water. This flow corresponds to the flow illustrated in FIG. 1b in which a phosphorus source, together with the C source, was added to water to be treated. Tables 1 and 2 show the results.

TABLE 1

| | Urea concentration of biologically treated water(μg/L) | | | | |
|---|---|---|---|---|---|
| | Before load fluctuation | After load fluctuation | | | Note |
| | | After 6 h | After 12 h | After 24 h | |
| Example1 | <2 | 5 | 3 | <2 | Single-stage treatment |
| Comparative example1 | <2 | 70 | 55 | 40 | Without carbon source |
| Reference example1 | 10 | 50 | 25 | 15 | Without combined chlorine agent |
| Example2 | <2 | <2 | <2 | <2 | Two-stage treatment |

TABLE 2

| | FI (SDI) value |
|---|---|
| Example1 | 3~4 |
| Comparative example1 | 3~4 |
| Reference example1 | >6 |
| Example2 | 3~4 |

Table 1 shows that changes in the concentration of biologically treated water before and after a variation in the concentration of urea in raw water (load fluctuation) were small in Example 1. In contrast, in Comparative Example 1, in which no carbon source was added, the urea concentration after the elapse of 24 hours from load fluctuation (that is, after raw water free of urea was replaced with the simulated raw water) was still high, indicating insufficient followability to the load fluctuation.

In Reference Example 1, in which no combined chlorine agent was added, although the quality of biologically treated water was slightly lower than Example 1, some followability to the load fluctuation was observed. In Example 2, in which the two-stage biological treatment was performed, no change in biologically treated water before and after the load fluctuation was observed, indicating excellent followability to the load fluctuation.

Table 2 shows that Examples 1 and 2 and Comparative Example 1, in which the slime control agent was added, had an FI (SDI) value in the range of 3 to 4, and Reference Example 1, in which no slime control agent was added, had an FI (SDI) value of more than 6. This result can be ascribed to a decreased number of outflowing bacterial cells or the deactivation of bacterial cells. Thus, it is concluded that biological treatment in the presence of the slime control agent can decrease load in posttreatment.

Examples and Comparative Examples of Ninth to Thirteenth Aspects

The ninth to thirteenth aspects are more specifically described in the following examples and comparative examples.

Examples 3 to 7

After an oxidizing agent and/or a bactericide was added to raw water, biological treatment was performed. City water of Nogi-machi (having an average urea concentration of 21 μg/L, a free residual chlorine of 0.5 mg/L, and the total residual chlorine of 0.6 mg/L) was used as raw water.

A slime control agent (combined chlorine "Kuriverter IK110", manufactured by Kurita Water Industries Ltd.) listed in Table 3 was added as an oxidizing agent and/or a bactericide to the raw water. The raw water was then supplied to a biological treatment means.

The biological treatment means was a cylindrical container charged with 10 L of granular activated carbon ("Kuricoal WG160, 10/32 mesh", manufactured by Kurita Water Industries Ltd.), which served as an organism carrier. The flow rate SV was 20.

After acclimatization with water for one month, the urea concentration at the outlet of the biological treatment means was measured. Table 3 shows the results.

The analytical procedures for urea are described below. First, the total residual chlorine concentration of test water was measured by a DPD method, and the test water was reduced with a significant amount of sodium bisulfite. (Subsequently, it was confirmed by the DPD method that the total residual chlorine was less than 0.01 mg/L.) The reduced test water was then supplied to an ion-exchange resin ("KR-UM1", manufactured by Kurita Water Industries Ltd.) at an SV of 50/h for deionization. After the reduced test water was concentrated 10 to 100 times with a rotatory evaporator, the urea concentration was measured by a diacetylmonoxime method.

Comparative Example 2

The raw water was treated in the same manner as in Example 3 except that no slime control agent was added. Table 3 shows the measurements of the urea concentration of water flowing from the biological treatment means.

Comparative Example 3

The raw water was treated in the same manner as in Comparative Example 2 except that the SV was 5. Table 3 shows the measurements of the urea concentration of water flowing from the biological treatment means.

Reference Example 2

The raw water was treated in the same manner as in Example 3 except that the amount of slime control agent added was 0.1 mg/L in terms of $Cl_2$ so that the total residual chlorine was not detected in the biologically treated water. Table 3 shows the measurements of the urea concentration of water flowing from the biological treatment means.

TABLE 3

| | Amount of slime control agent added (mg/LasCl$_2$) | Residual chlorine concentration (mg/LasCl$_2$) | Urea concentration of biologically treated water (μg/L) |
|---|---|---|---|
| Example3 | 0.2 | 0.04 | <2 |
| Example4 | 0.5 | 0.1 | 4 |
| Example5 | 1.0 | 0.15 | 17 |
| Example6 | 1.5 | 0.2 | 22 |
| Example7 | 2 | 0.3 | 20 |
| Comparative example2 | 0 | <0.02 | 21 |
| Comparative example3 | 0 | <0.02 | 15 |
| Reference example2 | 0.1 | <0.02 | 18 |

(SV = 5 for Comparative Example 3, SV = 20 for the others)

As described above, it was demonstrated that urea can be efficiently decomposed by a method for performing biological treatment of raw water according to the present invention. Thus, even when the size of biological treatment means is decreased, the urea concentration can be sufficiently lowered.

Although the present invention has been described in detail with reference to particular aspects, it is apparent to a person skilled in the art that various modifications can be made therein without departing from the spirit and scope of the present invention.

The present application is based on Japanese Patent Application (Japanese Patent Application No. 2010-049230) filed on Mar. 5, 2010 and Japanese Patent Application (Japanese Patent Application No. 2010-049231) filed on Mar. 5, 2010, which are incorporated herein by reference in their entirety.

The invention claimed is:

1. A water treatment method for performing biological treatment of raw water containing urea, the method comprising:
  a step of adding, first, a carbon source to the raw water,
  a step of adding a combined chlorine agent to the raw water before the biological treatment so that a biologically treated water has a total residual chlorine concentration in a range of 0.02 to 0.1 mg/L as $Cl_2$, and
  a step of supplying the raw water to a fixed bed comprising an organism-supporting carrier to perform the biological treatment after the step of adding the chlorine.

2. A method for producing ultrapure water, comprising
  a step of treating water treated by the water treatment method according to claim 1 by a primary pure water apparatus, and
  a step of treating treated water flowing from the primary pure water apparatus by a secondary pure water apparatus to produce ultrapure water.

3. The water treatment method according to claim 1, wherein the biologically treated water has a free residual chlorine concentration of less than 0.02 mg/L as $Cl_2$.

4. The water treatment method according to claim 1, wherein the raw water has a concentration of the urea in a range of 5 to 200 µg/L.

5. The water treatment method according to claim 1, wherein the carbon source is sodium acetate.

6. A water treatment method for performing biological treatment of raw water containing an organic substance, the method comprising:
  a step of adding a combined chlorine agent to the raw water before the biological treatment so that a biologically treated water has a total residual chlorine concentration in a range of 0.02 to 0.1 mg/L as $Cl_2$; and
  a step of performing the biological treatment in the presence of the combined chlorine agent.

7. The water treatment method according to claim 6, wherein the raw water is brought into contact with an organism-supporting carrier in the step of performing the biological treatment.

8. A method for producing ultrapure water, comprising
  a step of treating water treated by the water treatment method according to claim 6 by a primary pure water apparatus, and
  a step of treating treated water flowing from the primary pure water apparatus by a secondary pure water apparatus to produce ultrapure water.

9. The water treatment method according to claim 6, wherein the biologically treated water has a free residual chlorine concentration of less than 0.02 mg/L as $Cl_2$.

10. The water treatment method according to claim 6, wherein the raw water has a concentration of a urea in a range of 5 to 200 µg/L.

* * * * *